INVENTORS
CHARLES K. BIRDSALL
RICHARD M. WHITE
BY
Samuel E. Turner

ATTORNEY

United States Patent Office 3,427,573
Patented Feb. 11, 1969

3,427,573
LOW-PASS NON-REACTIVE FREQUENCY SELECTIVE FILTER IN WHICH HIGH FREQUENCIES ARE ABSORBED IN DISSIPATIVE MATERIAL
Charles K. Birdsall, Lafayette, and Richard M. White, Berkeley, Calif., assignors to General Electric Company, a corporation of New York
Filed Nov. 26, 1963, Ser. No. 326,142
U.S. Cl. 333—73                                         1 Claim
Int. Cl. H01p 1/20

This invention relates to filters for high frequency electromagnetic waves. The invention relates more specifically to microwave filters which are frequency selective.

The increased use of the microwave spectrum renders problems of interference more acute. As the trend toward more sensitive receivers and higher transmitter power continues, the need to separate the desired and the undesired microwave energy increases.

While various types of filter structures have been proposed, many of these prior filters are based upon mode discrimination. It is desirable to provide a filter structure wherein filtering is based on frequency rather than mode of propagation because it is usually the frequency of the undesired energy that distinguishes it from the desired energy. For example, undesirable harmonics of a wave of desired fundamental frequency may propagate in the same mode as the fundamental, thus rendering the use of mode filters ineffective to separate the fundamental from its harmonics.

It is therefore a principal object of the invention to provide a frequency selective filter.

It is another object of the invention to provide a filter structure wherein the propagation of electromagnetic energy of a frequency above a predetermined frequency is substantially prevented.

It is another object of the invention to provide a frequency selective filter wherein microwave energy of unwanted frequencies is substantially absorbed.

It is a further object of the invention to provide a microwave filter which is relatively simple in structure and which has high power handling capability.

These and other objects are achieved by a filter structure according to the invention comprising a periodic wave transmission structure having the characteristics of propagating desired electromagnetic waves of frequencies below a predetermined transition region and radiating undesired electromagnetic waves of frequencies above the transition region. Absorptive material is placed in the path of the radiated undesired energy for dissipation thereof.

The invention is described more specifically hereinafter with reference to the accompanying drawings wherein.

Figure 1:
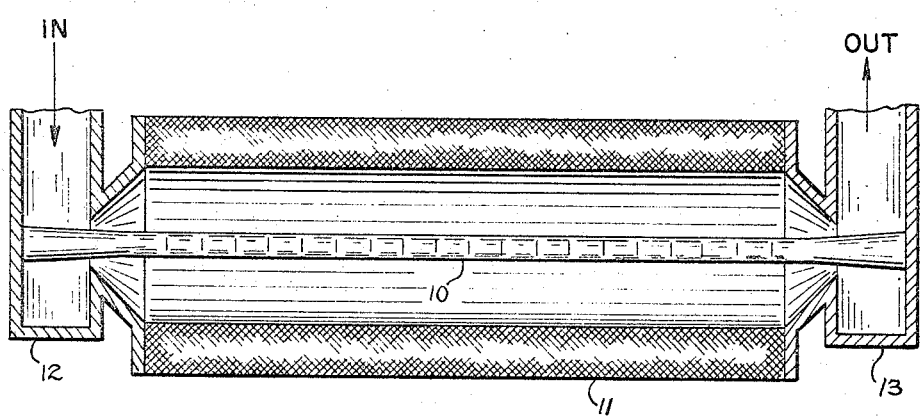
FIGURE 1 is a longitudinal section view of a frequency selective filter according to the invention.

FIGURE 1 is a longitudinal section view of a general embodiment of the frequency selective filter of the invention. The filter comprises an electromagnetic wave transmission structure 10 having frequency selective characteristics, an absorptive structure 11, an input coupler 12 for launching electromagnetic waves on the wave transmission structure 10, and an output coupler 13 for receiving electromagnetic waves from the wave transmission structure 10. The wave transmission structure 10 has the characteristic of propagating waves of desired frequency and radiating waves of undesired higher frequencies, the absorptive structure 11 is positioned to intercept and absorb the undesired radiated energy.

The frequency selective characteristics of the wave transmission structure will now be considered in more detail.

It has been found that open or partly open periodic wave transmission structures have unique propagation characteristics which make them adaptable for use in the frequency selective filter of the invention, that is, by proper choice of dimensions such structures can be made to propagate, along the axis of the structure, waves having frequencies below a predetermined transition region of frequencies and to radiate waves having frequencies above the transition region.

The property of being "open," which is not readily definable in purely geometric terms, means for present purposes that the energy radiated from the structure does not reflect back to the structure.

Periodic structures are structures which have some dimension which varies periodically along the axis of propagation thereof. The fields of an electromagnetic wave propagating along such a structure are consequently periodic.

Many examples of periodic structures are known in the art. Examples of open periodic wave transmission structures which may be employed in the filter of the invention include the helix, the folded line, the interdigital line, the zig-zag line, the ring bar circuit, the open slot circuit, the corrugated surface, and ladder circuits of various types. That such open periodic structures allow propagation only in certain well-defined regions and forbid propagation outside of such regions has been previously recognized.

For example, such characteristics of the helix structure are discussed by Sensiper in an article entitled "Electromagnetic Wave Propagation on Helical Structures," Proc. IRE, volume 43, February 1955, pp. 149–161.

Similar characteristics of ladder structures are discussed by White, Birdsall and Grow, in an article entitled "Multiple-Ladder Circuits for Millimeter Wavelength Traveling-Wave Tubes," Proceedings of the Symposium on Millimeter Waves, Polytechnic Institute of Brooklyn, New York, 1959.

Reference is made to the foregoing references for a more complete exposition of the propagation characteristics of open periodic wave transmission structures. Briefly, the propagation constant for periodic structures having uniform pitch $p$ are of the form $$\beta_m = \beta_0 + 2\pi m/p$$
$$m = 0, \pm 1, \pm 2, \ldots$$

where: $\beta_m$ is the phase constant of the $m$th spatial harmonic; $\beta_0$ is the phase constant of the fundamental ($m=0$); and $m$ is the number of the axial spatial harmonic.

Figure 2:
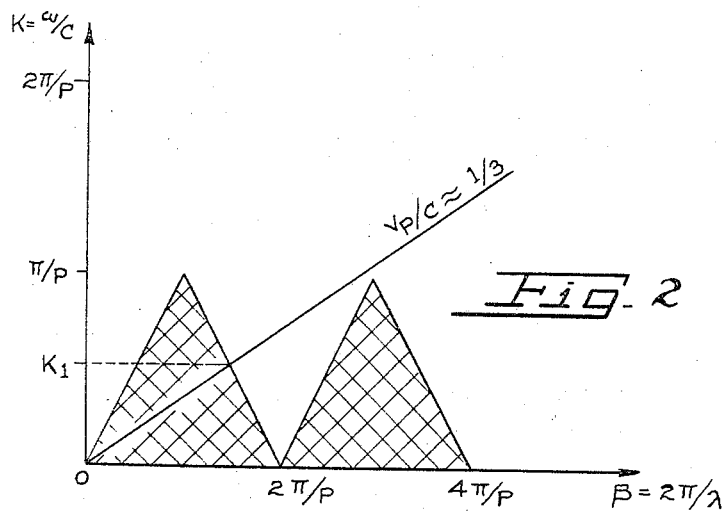
FIGURE 2 is a $k$ versus $\beta$ diagram illustrating propagating characteristics of open periodic wave transmission structures.

The condition for the allowance of propagation along open periodic structures is $|\beta_m| > |k|$ where $k = 2\pi/\lambda$ and $\lambda$ is the wavelength. For propagation along the axis of the structure the phase velocity of propagation $v_p$ equals $\omega/\beta$ where $\omega$ is the angular frequency. Thus there will appear on an $\omega$ versus $\beta$ diagram, for each spatial harmonic which exists on the structure, a region wherein propagation is allowed and outside of which propagation is forbidden. These regions are shown in FIG. 2 which is an idealized $k$ versus $\beta$ diagram of the propagation characteristics of open periodic structures (where $k=\omega/c$, $\beta=\omega/v_p=2\pi/\lambda$ and $c$ is the velocity of light. The crosshatched regions are the regions of allowed propagation.

Since the total field of a wave on the structure comprises the sum of all of the spatial harmonics, propagation is permitted only in regions allowed for all spatial harmonics, that is, in the crosshatched regions of FIG. 2. Thus on such a structure no propagation is allowed for waves having a frequency such that $k>\pi p$ which corresponds to a wavelength of $\lambda<p/2$, where $p$ is the pitch of the structure. Therefore in general these open periodic structures will propagate waves having wavelengths greater than the pitch ($p$) of the structure divided by 2 and will radiate waves having wavelengths $\lambda<p/2$. It is therefore seen that these structures have a frequency dependent propagation characteristic, advantage of which is taken in the present invention to provide a relatively simple and effective frequency selective filter.

For employment in the present invention the dimensions of the open periodic wave transmission structure are selected such that at the frequency ($f$) of the desired fundamental wave $\pi/2p<k<\pi/p$ or $c/4p<f<c/2p$ (where $c$ is the velocity of light). In such a case the frequencies which are harmonics of the fundamental wave of frequency $f$ correspond to a $k$ which is greater than $\pi/p$. Thus these harmonics are not propagated but are instead radiated from the structure.

Figure 3:
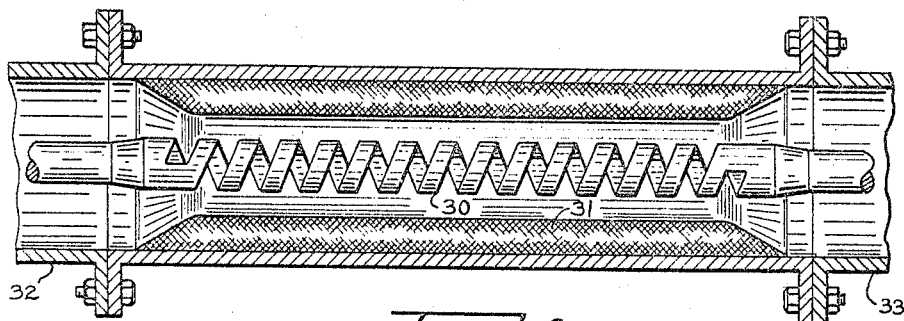
FIGURE 3 is a longitudinal section view of a filter according to the invention which employes a wave transmission structure in the form of a helix.

In FIG. 3 there is shown an embodiment of a filter according to the invention which employs a helix 30 as the open periodic wave transmission structure. A description of an example of a specific design of such a filter follows:

To prevent propagation beyond the first allowed region to the right of the origin as shown in FIG. 2, the helix was designed to have a phase velocity ratio $v_{p/c}$ of slightly more than ⅓ as illustrated by the phase velocity line $v_{p/c}\approx\frac{1}{3}$ in FIG. 2. Thus it is noted that the phase velocity line just misses entering the second allowed region of the $k$ versus $\beta$ diagram of FIG. 2. The propagation cutoff frequency therefore corresponds to a $k$ indicated as $k_1$ in FIG. 2.

The helix was designed to couple directly to a standard 1⅝ inch coaxial transmission line. From the dimensions of the coaxial line and the requirement of a phase velocity ratio of about ⅓, the resulting helix has an inside diameter of 0.5 inch and a pitch of 0.736 inch (or 1.36 turns per inch). The helix of this example was ten pitches long. The calculated cutoff frequency, that is, the transition from allowed propagation to forbidden propagation regions, was 3.84 K mc.

As illustrated in FIG. 3 a cylindrical absorptive structure 31 is positioned in spaced relation to the helix 30 to absorb the electromagnetic energy which is not propagated but which is instead radiated therefrom. While any well-known absorptive material can be used, in the specific design under discussion, the absorptive structure was formed of Synthane (a product of the Synthane Corporation, Oaks, Pennsylvania) with an inner diameter of about one inch, an outer diameter of about 1½ inches and a length of about 9 inches.

Figure 4:
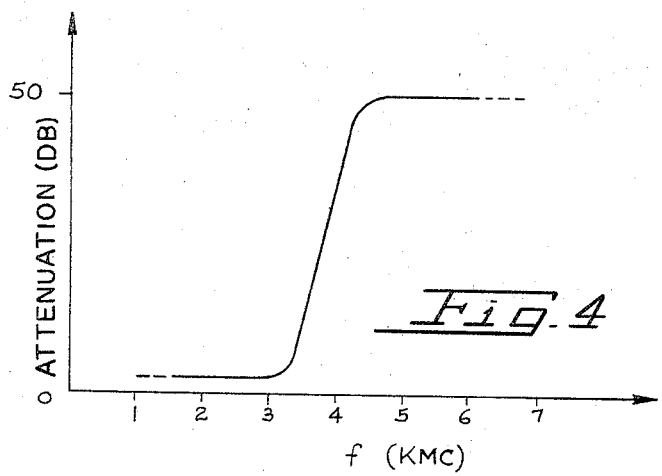
FIGURE 4 is an attenuation versus frequency diagram illustrating the attenuation characteristics of an example filter constructed according to the invention.

The effectiveness of the filter is illustrated in FIG. 4 which is an attenuation versus frequency of the example filter described above. This curve illustrates propagation, and therefore low attenuation of frequencies below 3 K mc., a transition region from about 3–4.5 K mc. and relatively high attenuation of frequencies above 5 K mc.

While a filter employing a helix as the open periodic wave transmission structure has been described as a specific example, other forms of transmission structures can be similarly employed as may be advantageous, for example, for other frequency ranges or at different power levels.

Figure 5:
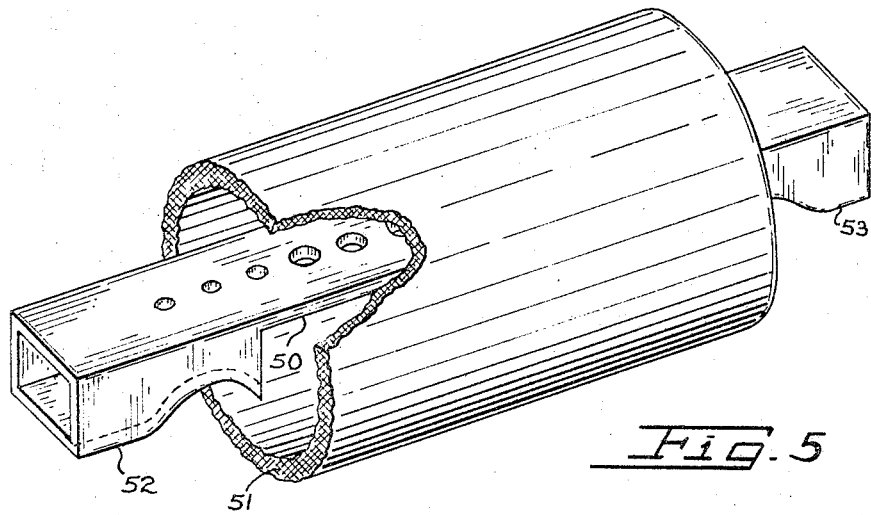
FIGURE 5 is a perspective view of an embodiment of the invention employing a type of ladder circuit as a frequency selective wave transmission structure.

Among the suitable transmission structures are the ladder circuits. Illustrated in FIG. 5 is a filter according to the invention which employs a form of ladder circuit known as the "holey" ladder circuit. Thus the filter of FIG. 5 includes a holey ladder circuit 50, an absorptive structure 51 surrounding the ladder circuit, an input coupler 52 and an output coupler 53. The propagation characteristics of the holey ladder circuit, as well as the propagation characteristics of ladder circuits in general, are discussed by White, Birdsall and Grow in the previously mentioned article. The propagation characteristics of ladder circuits depend upon the dimensions thereof including the shape and relative size of the rungs and slots (or the diameter of the holes in the case of the holey ladder circuit) as well as the pitch of the circuit. These dimensions can be selected to provide the desired frequency ranges of the allowed and forbidden propagation regions.

As illustrated in FIG. 5, the input coupler 52 is a section of a waveguide which is shaped to provide a suitable transition from the waveguide to the ladder circuit, the ladder circuit being an apertured continuation of the upper wall of the waveguide. Also the first few apertures or holes of the holey ladder structure may advantageously be graduated in size to enhance the transition. The output coupler 53 may comprise a similar arrangement, it being understood that other types of transitions can be employed.

Figure 6:
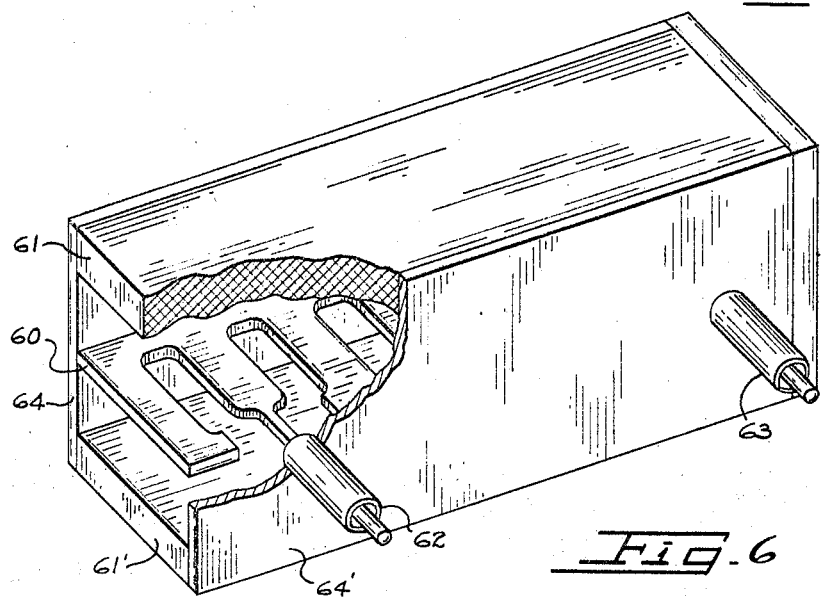
FIGURE 6 is a perspective view of an embodiment of the invention employing a trough loaded wave transmission structure to provide a low frequency cutoff characteristic.

Illustrated in FIG. 6 is an embodiment of the filter of the invention which employs a trough-loaded ladder circuit as the wave transmission structure. In this embodiment a ladder circuit 60, illustrated as comprising a conductive plate formed with a series of regularly spaced substantially rectangular apertures, is fixed between a pair of conducting side plates 64 and 64' to form the trough-loaded circuit, the dimensions of the ladder circuit 60 including the pitch being selected to exhibit the desired allowed and forbidden propagation regions in the desired frequency ranges. A pair of absorptive members 61 and 61' are positioned in spaced relation to the ladder circuit 60 to intercept energy radiated therefrom. Input energy may be fed to the ladder circuit 60 through a coaxial line 62, the center conductor of which is connected to a rung of the ladder circuit in well-known fashion. A similar arrangement may be used for output coupling from the ladder circuit to a coaxial line 63.

The embodiment of FIG. 6 has the additional advantage of providing a filter having a bandpass characteristic, the upper cutoff frequency being determined by the propagation cutoff characteristic of the ladder circuit 60, as previously discussed, and the lower cutoff frequency being determined by the separation of the side plates 64 and 64'. The lower cutoff frequency corresponds to a cutoff wavelength approximately equal to twice the spacing of the side plates 64 and 64'.

The radiation of undesired energy from the wave transmission structures employed in the invention is desirably in a direction transverse to the axis of propagation of the structure so that a simple absorptive structure can be used. However, some of the undesired energy may be radiated at angles other than ninety degrees to the axis. There may also be some radiation of undesired energy by the output coupling structure. It is desirable to prevent the pickup of radiated undesired energy by the output coupling structure.

Figure 7:
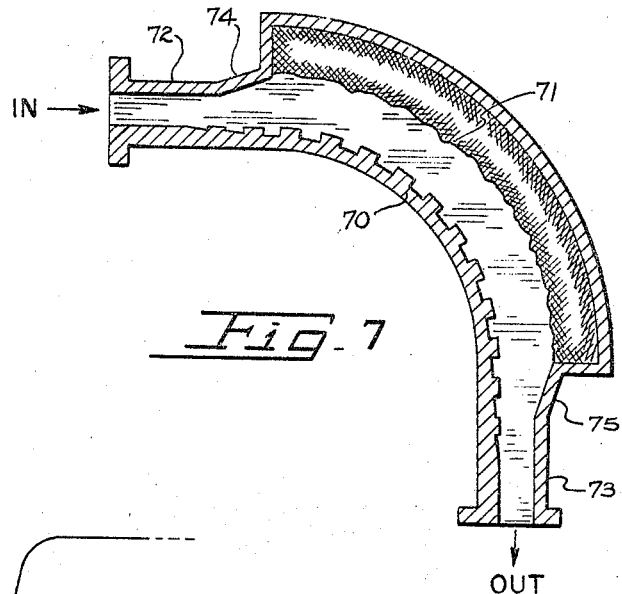
FIGURE 7 is a longitudinal section view of an embodiment of the invention which is constructed with a configuration to substantially prevent radiation of undesired energy to the output energy collector or coupler.

A filter structure is illustrated in FIG. 7 wherein the axis of the wave transmission structure is curved or bent. The consequent relative positioning of the output coupler substantially eliminates the possibility of its receiving direct radiation from the input coupler or from the wave transmission structure.

The longitudinal section view of the filter structure of FIG. 7 illustrates the employment of an open periodic wave transmission structure 70 of the well-known vane or corrugated surface type, the corrugations being formed of a series of spaced rectangular conducting bars fixed to a conductive supporting strip. The dimensions of the structure, including the pitch, may be selected with respect to the frequency range of operation desired to provide the desired propagating and non-propagating regions.

The embodiment of FIG. 7 further includes an absorptive structure 71 positioned in the path of energy radiated from the wave transmission structure 70. As illustrated, the absorptive structure 71 may be formed with an uneven surface, which may be corrugated, serrated, pyramided or the like, to enhance the non-reflective character thereof.

As illustrated in FIG. 7, input energy is received by an input coupling structure in the form of a waveguide section 72 which is formed with a flared portion 74. The flared portion 74 together with the reduced height of the first few vanes or corrugations, as illustrated, provide a transition for the electromagnetic waves from the input waveguide section 72 to the wave transmission structure 70. An output coupling structure, which is similar to the input coupling structure, is formed of a waveguide section 73 having a flared portion 75.

Thus what has been described is an effective, relatively simple frequency selective filter structure which takes advantage of the allowed and forbidden propagation characteristics of open periodic wave transmission structures.

While the principlse of the invention have now been made clear in an illustrative embodiment, there will be immediately obvious to those skilled in the art many modification in structure, arrangement, proportions, the elements, materials, and components used in the practice of the invention, and otherwise, which are particularly adapted for specific environments and operating requirements, without departing from those principles. The appended claim are therefore intended to cover and embrace any such modification, within the limits only of the true spirit and scope of the invention.

What is claimed is:

1. An electromagnetic wave frequency filter system comprising:
   (a) coaxial microwave transmission line means providing a source of electromagnetic wave energy of mixed frequencies above and below a predetermined frequency limit;
   (b) an input coupler including a tapered transition section;
   (c) wave filter means connected to said source of electromagnetic wave energy by said input coupler for filtering waves of frequency above said predetermined frequency limit from said wave energy while transmitting waves of frequencies below said predetermined frequency limit, said tapered transition section being connected directly thereto, said filter means including:
      (1) a periodic wave transmission means having a pitch substantially equal to twice the length of a wavelength corresponding to the upper frequency limit so that said transmission means is at least partly open and electromagnetic waves below said predetermined frequency limit propagate along said transmission means and electromagnetic waves above said predetermined limit are radiated from said transmission means, said periodic means being a helix and
      (2) a cylindrical electromagnetic wave energy absorptive structure surrounding said helix and positioned in spaced relation thereto for inserting and absorbing the electromagnetic wave energy radiated from said transmission structure, and
   (d) an output coupler including a tapered transition section connected to said helix,
   (e) means connected to said output coupler for receiving the electromagnetic waves propagated along said periodic wave transmission means.

References Cited

UNITED STATES PATENTS

| | | | |
|---|---|---|---|
| 3,309,633 | 3/1967 | Mayer | 333—79 |
| 3,199,054 | 8/1965 | Holland | 333—31 |
| 2,940,057 | 6/1960 | Miller | 333—73 |
| 2,968,775 | 1/1961 | Rose. | |
| 3,020,444 | 2/1962 | Wolkstein | 315—39.3 |
| 2,925,565 | 2/1960 | Cook | 333—6 |
| 2,793,315 | 5/1957 | Haeff | 315—3.6 |
| 2,768,328 | 10/1956 | Pierce | 315—39.3 |
| 2,602,148 | 7/1952 | Pierce | 315—39 |
| 3,191,132 | 6/1965 | Mayer | 333—79 |

OTHER REFERENCES

Procedure I.R.E. (Sensiper), vol. 43, February 1955, pp. 149–161.

HERMAN KARL SAALBACH, *Primary Examiner.*

C. BARAFF, *Assistant Examiner.*

U.S. Cl. XR.

333—31, 81